US006587476B1

(12) United States Patent
Lewin et al.

(10) Patent No.: US 6,587,476 B1
(45) Date of Patent: Jul. 1, 2003

(54) ETHERNET FRAME ENCAPSULATION OVER VDSL USING HDLC (75) Inventors: Amit Lewin, Tel Aviv (IL); Ilan Glaser, Tel Aviv (IL); Yackov Sfadya, Kfar Saba (IL); Yuri Poddobny, Herzelia (IL)

(73) Assignee: 3 Com Corporation, Santa Clara, CA (US)

( * ) Notice: Subject to any disclaimer, the term of this patent is extended or adjusted under 35 U.S.C. 154(b) by 0 days.

(21) Appl. No.: 09/320,854

(22) Filed: May 26, 1999

(51) Int. Cl.$^7$ .................................................. H04J 3/16
(52) U.S. Cl. ....................... 370/467; 370/474; 375/222; 709/236
(58) Field of Search ................................. 370/229, 395, 370/352–356, 400, 401, 466, 467, 397, 386, 389, 470, 474; 379/93.01; 375/229, 211, 222, 260; 709/236; 455/560

(56) References Cited

U.S. PATENT DOCUMENTS

| 5,410,343 A | 4/1995 | Coddington et al. ........... 725/99 |
| 5,778,189 A | * 7/1998 | Kimura et al. ................. 709/236 |

(List continued on next page.)

FOREIGN PATENT DOCUMENTS

| EP | 1206109 A1 | 5/2002 | ........... H04M/11/06 |

OTHER PUBLICATIONS

Technical Report TR–003, Framing and Encapsulation Standards for ADSL: Packet Mode, Jun. 1997.*
RFC 1662, PPP in HDLC–like Framing, Jul. 1994.*
Taylor, "Internetworking Handbook", 1998, McGraw Hill, second edition, p. 697.*
Broadcom Product Brief, BCM5203 Overview, Broadcom Corporation, Irvine, CA (1998), 2 pages.
VDSL Draft Specification, ANSI T1E1.4 Subcommittee, American National Standards Institute, Huntsville, Alabama, Jun. 1998, 4 pages.
MPC 860 PowerQUICC™ User's Manual, Chapter 24, Motorola Corp., Jul. 1998.

*Primary Examiner*—Hassan Kizou
*Assistant Examiner*—John Pezzlo
(74) *Attorney, Agent, or Firm*—Howard Zaretsky (57) ABSTRACT An apparatus for and method of encapsulating Ethernet frame data in HDLC frames for transmission over a VDSL transport facility. The HDLC frames are transmitted over a point to point VDSL link where they are subsequently extracted and forwarded as standard Ethernet frames. The VDSL facility transport system comprises one or more Ethernet to VDSL CPEs coupled to a DSLAM over a VDSL transport facility. The Ethernet to VDSL CPE functions to receive a 10BaseT Ethernet signal and encapsulate the Ethernet frame into a HDLC frame for transmission over the VDSL facility. In one embodiment, a single chip microcontroller on the CPE performs both Ethernet controller and HDLC controller functions. The DSLAM is adapted to receive HDLC frames from one or more CPEs, extract Ethernet frames therefrom and generate and output a standard Ethernet signal. Ethernet frames are encapsulated within HDLC frames and transmitted on the wire pair without regard to the state of the SOC signals. This overcomes the problems associated with synchronizing the transmission of the Ethernet data with the SOC signals.

15 Claims, 5 Drawing Sheets

U.S. PATENT DOCUMENTS

| | | | |
|---|---|---|---|
| 5,784,683 A | 7/1998 | Sistanizadeh et al. | 725/73 |
| 5,790,548 A | 8/1998 | Sistanizadeh et al. | 370/401 |
| 5,812,786 A | 9/1998 | Seazholtz et al. | 709/233 |
| 5,905,781 A | 5/1999 | McHale et al. | 379/93.14 |
| 5,909,564 A | 6/1999 | Alexander et al. | 395/311 |
| 5,978,373 A | 11/1999 | Hoff et al. | 370/392 |
| 5,991,308 A | 11/1999 | Fuhrmann et al. | 370/342 |
| 5,999,565 A * | 12/1999 | Locklear, Jr. et al. | 375/222 |
| 6,055,297 A | 4/2000 | Terry | 379/1 |
| 6,084,881 A * | 7/2000 | Fosmark et al. | 370/397 |
| 6,088,368 A | 7/2000 | Rubinstain et al. | 370/480 |
| 6,101,182 A | 8/2000 | Sistanizadeh et al. | 370/352 |
| 6,104,749 A | 8/2000 | Lu et al. | 375/222 |
| 6,157,635 A * | 12/2000 | Wang et al. | 370/352 |
| 6,178,161 B1 | 1/2001 | Terry | 370/276 |
| 6,236,664 B1 | 5/2001 | Erreygers | 370/492 |
| 6,286,049 B1 | 9/2001 | Rajakarunanayake et al. | 709/227 |
| 6,339,613 B2 | 1/2002 | Terry | 370/201 |
| 6,351,487 B1 | 2/2002 | Lu et al. | 375/225 |
| 6,363,128 B1 | 3/2002 | Isaksson et al. | 370/480 |
| 6,374,288 B1 | 4/2002 | Bhagavath et al. | 709/203 |
| 6,404,861 B1 | 6/2002 | Cohen et al. | 379/93.01 |
| 6,424,657 B1 | 7/2002 | Voit et al. | 370/412 |

* cited by examiner

ETHERNET FRAME ENCAPSULATION OVER VDSL USING HDLC

FIELD OF THE INVENTION

The present invention relates generally to data communication systems and more particularly relates to a system for transporting Ethernet frames over Very high speed Digital Subscriber Line (VDSL) using the HDLC protocol.

BACKGROUND OF THE INVENTION

There is a growing need among both individuals and enterprises for access to a commonly available, cost effective network that provides speedy, reliable services. There is high demand for a high-speed data network, one with enough bandwidth to enable complex two-way communications. Such an application is possible today if, for example, access is available to a university or a corporation with sufficient finances to build this type of network. But for the average home computer user or small business, access to high speed data networks is expensive or simply impossible. Telephone companies are therefore eager to deliver broadband services to meet this current explosion in demand.

One of the problems is that millions of personal computers have found their place in the home market. Today, PCs can be found in approximately 43% of all United States households and a full 50% of United States teenagers own computers. Virtually every PC sold today is equipped with a modem, enabling communication with the outside world via commercial data networks and the Internet. Currently, people use their PCs to send and receive e-mail, to access online services, to participate in electronic commerce and to browse the Internet. The popularity of the Internet is such that there are an estimated 50 million users around the globe. These figures indicate that in the past few years the personal computer has fueled a dramatic increase in data communications and the corresponding demands on the data networks that carry the traffic.

The Internet serves as a good example of the increased demands that have been placed on data networks. At first, Internet access consisted of text only data transfers. Recently, with the popularity of the World Wide Web (WWW) and the construction of numerous sites with high quality content, coupled with the development of Internet browsers such as Mosaic, Netscape Navigator and Microsoft Explorer, the use of graphics, audio, video and text has surged on the Internet. While graphics, audio and video make for a much more interesting way to view information as opposed to plain text, bandwidth consumption is significantly increased. A simple background picture with accompanying text requires approximately 10 times the bandwidth needed by text alone. Real-time audio and streaming video typically need even more bandwidth. Because of the increased requirement for bandwidth, activities such as browsing home pages or downloading graphics, audio and video files can take a frustratingly long period of time. Considering that the multimedia rich World Wide Web accounts for more than one quarter of all Internet traffic, it is easy to see why the demand for bandwidth has outpaced the supply. In addition, the creative community is pushing the envelope by offering audio and full motion video on numerous sites to differentiate themselves from the millions of other sites competing for maximum user hits.

As use of the Internet and online services continues to spread, so does the use of more complex applications, such as interactive video games, telecommuting, business to business communications and video conferencing. These complex applications place severe strains on data networks because of the intensive bandwidth required to deliver data-rich transmissions. For example, a telecommuter who requires computer aided design (CAD) software to be transported over the data network requires a high-bandwidth data pipeline because of the significant size of CAD files. Similarly, a business to business transaction in which large database files containing thousands of customer records are exchanged also consumes large amounts of bandwidth. The same is true for users seeking entertainment value from sites offering high quality video and audio. The lack of available bandwidth in today's data networks is the primary barrier preventing many applications from entering mainstream use. Just as processing power limited the effectiveness of early PCs, bandwidth constraints currently limit the capabilities of today's modem user.

Most computer modem users access data through the standard telephone network, known as plain old telephone service (POTS). Even when equipped with today's speediest modems, dial up modems on a POTS network can access data only at a rate of 28.8, 33.6 or 56 Kbps. Dial up modem transmission rates have increased significantly over the last few years, but POTS throughput is ultimately limited to 64 Kbps. While this rate may be acceptable for some limited applications like e-mail, it is a serious bottleneck for more complex transactions, such as telecommuting, video conferencing or full-motion video viewing. To illustrate, full motion video compressed, using the Motion Picture Entertainment Group (MPEG)-2 standard requires a data stream of approximately 6 Mbps, or roughly 208 times the throughput of a 28.8 Kbps modem. Thus, using today's dial up modems, it would take more than 17 days to capture two hours of video. As bandwidth demands continue to grow, providers search for better ways to offer high speed data access. Further complicating the problem is the need to deliver all these complex services at an affordable price.

Today's most popular data access method is POTS. But as discussed previously, POTS is limited when it comes to large data transfers. An alternative to POTS currently available is Integrated Services Digital Network (ISDN). In the past few years, ISDN has gained momentum as a high-speed option to POTS. ISDN expands data throughput to 64 or 128 Kbps, both from the network to the home and from the home back to the network, and can be technically made available throughout much of the United States and in many other parts of the globe. Similar to POTS, ISDN is a dedicated service, meaning that the user has sole access to the line thus preventing other ISDN users from sharing the same bandwidth. ISDN is considered an affordable alternative, and in general, ISDN is a much better solution for applications such as Web browsing and basic telecommuting. However, like POTS, ISDN is severely limited in applications such as telecommuting with CAD files and full-motion video viewing. The latter requires roughly 39 times the throughput than that provided by ISDN.

Multichannel multipoint distribution service (MMDS), a terrestrial microwave wireless delivery system, and direct broadcast satellite (DBS), such as DirecTv and US Satellite Broadcasting (USSB), are wireless networks. They both deliver high bandwidth data steams to the home, referred to as downstream data, but neither has a return channel through which data is sent back over the network, referred to as upstream data. Although it is a relatively affordable system to deploy for broadcast applications, because it requires no cable wires to be laid, it falls short in interactive access. In order to use a wireless system for something as basic as e-mail, an alternate technology such as a telephone line must be used for the upstream communications.

Another available network delivery system is asymmetric digital subscriber line (ADSL). Offering a downstream capacity of 6 Mbps or more to the home, ADSL has the downstream capacity to handle the most complex data transfers, such as full motion video, as well as an upstream capacity of at least 500 Kbps. However, due to its limitation of upstream bandwidth capacity, it essentially is a single service platform. Also, since it has to overcome the challenge of reusing several thousand feet of existing twisted pair wiring, the electronics required at each end of the cable are complex, and therefore currently very expensive. the challenge of reusing several thousand feet of twisted pair wiring, the electronics required at each end of the cable are complex, and therefore currently very expensive.

Hybrid fiber coax (HFC), a network solution offered by telephone and cable companies, is yet another option for delivering high bandwidth to consumers that is known in the art. However, HFC has limitations. HFC networks provide a downstream capacity of approximately 30 Mbps, which can be shared by up to 500 users. Upstream bandwidth is approximately 5 Mbps and also is shared. A disadvantage with HFC is that shared bandwidth and limited upstream capacity become serious-bottlenecks when hundreds of users are sending and receiving data on the network, with service increasingly impaired as each user tries to access the network.

It is a current trend among telephone companies around the world to include existing twisted pair copper loops in their next generation broadband access networks. Hybrid Fiber Coax (HFC), a shared access medium well suited to analog and digital broadcast, comes up short when utilized to carry voice telephony, interactive video and high speed data communications at the same time.

Fiber to the home (FTTH) is still prohibitively expensive in the marketplace that is soon to be driven by competition rather than costs. An alternative is a combination of fiber cables feeding neighborhood Optical Network Units (ONUs) and last leg premises connections by existing or new copper. This topology, which can be called fiber to the neighborhood (FTTN), encompasses fiber to the curb (FTTC) with short drops and fiber to the basement (FTTB), serving tall buildings with vertical drops.

One of the enabling technologies for FTTN is very high rate digital subscriber line (VDSL). VDSL is an emerging standard that is currently undergoing discussion in ANSI and ETSI committees. The system transmits high-speed data over short reaches of twisted pair copper telephone lines, with a range of speeds depending upon actual line length.

The VDSL standard as provided by the VDSL Draft Specification being drafted by the ANSI TIE1.4 Technical Subcommittee, provides guidelines for the transmitter and receiver within the VDSL modem. The connection between the VDSL modem and the Customer Premises Equipment (CPE) specifies a number of signals including TxData, RxData, RxErr, TxCLK, RxCLK and TxSOC and RxSOC. The latter two signals, i.e., TxSOC and RxSOC, provide an indication of the start of the payload within the respective VDSL frame to the CPE for both transmission and reception.

It is intended that the SOC signal be used by the CPE to synchronize the transmission and reception of the data to and from VDSL modem. In the case of transporting Ethernet data over the VDSL facility, a problem arises, however, when attempting to sync Ethernet frames to VDSL frames. The problem with using these SOC signals is that the VDSL frame is a fixed number of bytes, e.g., 256 bytes, whereas the Ethernet frame may vary from 64 to 1518 bytes. Designing and implementing the circuitry, e.g., state machines, timing and framing circuits, etc., to perform the protocol matching, i.e., sync timing between Ethernet frames and VDSL frames is very complicated and hence expensive to implement.

It is desirable to have a means of transporting Ethernet frame data over a VDSL transport facility that does not require the complicated circuitry and state machines when utilizing the SOC signals provided by the VDSL modem.

One of the challenges in implementing a mechanism of transporting Ethernet traffic over VDSL is the requirement of enabling the recipient to synchronize to the Ethernet stream, i.e., to enable the receiver to 'know' where the Ethernet frame starts and where it ends. The Ethernet frames are normally conveyed to the Ethernet transceiver from the line utilizing Manchester encoding. This code comprises three states which are IDLE where the signal is constantly high, a '1' or a '0' bit wherein each contains a transition at the midpoint of the bit period.

The direction of the transition determines whether the bit is interpreted as a '0' or a '1'. The first half is the actual value and the second half is the complement of the actual bit value. By using this coding scheme, the transceiver is able to 'know' where an Ethernet packet starts and where it ends.

This coding scheme, however, cannot be applied to a VDSL transport system because the VDSL receiver would receive at its input either a '1' or a '0' without any mechanism for the user to indicate to the VDSL transceiver where an incoming Ethernet frame starts or where it ends, e.g., TxEnable or RxEnable. The same problem is present in the reverse direction as well, wherein the VDSL transceiver transmits a bit stream with no mechanism to indicate where in the bit stream the Ethernet frame starts or ends.

As described above, a typical VDSL transceiver provides a SOC signal for the transmit and receive directions. It is intended that these signals permit the user to synchronize the Ethernet frames. Because these frames are of variable length, however, achieving synchronization using the SOC signals is relatively complicated to implement and requires a large amount of additional logic. Thus it would be desirable to have an alternative means of synchronizing the Ethernet frame data at the receiver.

SUMMARY OF THE INVENTION

The present invention is an apparatus for and method of encapsulating Ethernet frame data in Very high speed Digital Subscriber Line (VDSL) frames. The VDSL frames are transmitted over a point to point VDSL link where they are subsequently extracted and forwarded as standard Ethernet frames. The invention utilizes the widely known HDLC communications protocol to encapsulate Ethernet frames for transmission over the VDSL transport facility of the invention. An HDLC controller is employed to perform the conversion between Ethernet frames and HDLC frames.

A typical VDSL facility transport system comprises an Ethernet to VDSL Consumer Premises Equipment (CPE) coupled to a DSL Access Multiplexor (DSLAM) over a VDSL transport facility. The DSLAM is typically located at the curb or before the 'last mile' in a subscriber loop. The Ethernet to VDSL CPE functions to receive a 10BaseT Ethernet signal and encapsulate the Ethernet frame into an HDLC frame for transmission over the VDSL facility utilizing the HDLC protocol. Likewise, the Ethernet to VDSL CPE also functions to receive a VDSL signal in HDLC protocol format, extract Ethernet frames therefrom and output them as standard 10BaseT Ethernet signals.

The DSLAM is adapted to receive HDLC protocol formatted frames, extract Ethernet frames therefrom and generate and output a standard Ethernet signal. Likewise, the DSLAM is also adapted to receive standard Ethernet frames from an Ethernet input signal and encapsulate them in HDLC frames for transmission over the VDSL facility.

In accordance with the invention, the SOC signals provided by the VDSL transceiver are not utilized in transmitting the Ethernet frame data over the VDSL facility. Ethernet frames are encapsulated within HDLC frames and transmitted on the wire pair without regard to the state of the SOC signals. This overcomes the problems associated with synchronizing the transmission of the Ethernet data with the SOC signals.

The characteristics of the HDLC controller, i.e., the sync flag, are used in the present invention to provide the receiving station with an indication of the start of a HDLC frame. The bit stuffing capabilities built into the HDLC controller prevent the occurrence of a sync flag in the data stream.

The receiving station performs standard HDLC reception to determine whether the preamble detected is a sync flag indicating the start of a HDLC frame. The payload of the VDSL frame carries Ethernet frame data that can range from 60 to 1514 bytes. Note that before HDLC encapsulation, the 4 byte Ethernet CRC is extracted.

An Ethernet controller is used to receive and transmit Ethernet frames to and from the Ethernet physical layer transceiver. Both the HDLC controller and the Ethernet controller can be implemented utilizing a commercially available microprocessor or microcontroller.

There is provided in accordance with the present invention a method of transporting Ethernet frames over a Very high speed Digital Subscriber Line (VDSL) transport facility coupling a first communication device and a second communication device, the method comprising the steps of receiving an input Ethernet frame data on the first communication device from a first Ethernet compatible communication device coupled thereto, encapsulating the received Ethernet frame within a High level Data Link Control (HDLC) frame, transmitting the HDLC frame over the VDSL transport facility, receiving HDLC frame data on the second communication device, extracting the Ethernet frame from the received HDLC frame and generating an output Ethernet frame therefrom and transmitting the output Ethernet frame to a second Ethernet compatible communication device coupled to the second communication device.

The step of encapsulating comprises the step of stripping off the preamble, start of frame fields and Cyclic Redundancy Check (CRC) fields from the Ethernet frame and calculating a new CRC before placing the Ethernet frame in the HDLC frame. The step of generating comprises the step of adding Ethernet preamble and Ethernet start of frame fields and calculating a new CRC and appending it to the extracted Ethernet frame.

There is also provided in accordance with the present invention an Ethernet transport system for transporting Ethernet frames over one or more Very high speed Digital Subscriber Line (VDSL) transport facilities, the system comprising a plurality of channels wherein each channel comprises an Ethernet to VDSL Customer Premise Equipment (CPE) adapted to encapsulate Ethernet frames from a first Ethernet source into HDLC frames for transmission over the VDSL transport facility and to extract Ethernet frames from HDLC frames received over the VDSL transport facility, an access multiplexor adapted to interface with the plurality of channels, the access multiplexor adapted to encapsulate Ethernet frames from a second Ethernet source into HDLC frames for transmission to one of the plurality of channels and to extract Ethernet frames from HDLC frames received over the plurality of channels.

Each channel in the system comprises a microcontroller adapted to function as both an Ethernet controller and an HDLC controller.

There is further provided in accordance with the present invention an Ethernet transport system for transporting Ethernet frames over one or more Very high speed Digital Subscriber Line (VDSL) transport facilities, the system comprising a plurality of channels wherein each channel comprises an Ethernet to VDSL Customer Premise Equipment (CPE), each CPE comprising means for receiving an Ethernet frame from a first Ethernet source and encapsulating it within a High level Data Link Control (HDLC) frame, means for transmitting the HDLC frame onto one of the VDSL transport facilities, means for receiving the HDLC frame from one of the VDSL transport facilities and means for extracting the Ethernet frame from the HDLC frame and forwarding it to the first Ethernet source, an access multiplexor adapted to interface with the plurality of channels, the access multiplexor comprising an Ethernet switch having a plurality of ports, means for receiving from each channel, HDLC frames from a corresponding VDSL transport facility, means for extracting Ethernet frames from the HDLC frames and inputting then to a port on the switch, means for transmitting Ethernet frames from the Ethernet switch to a second Ethernet source, means for receiving Ethernet frames from the second Ethernet source and inputting them to the switch, means for encapsulating the Ethernet frames output of the switch into HDLC frames and means for transmitting the HDLC frames onto one of the VDSL transport facilities The means for encapsulating and extracting on each of the channels comprises a microcontroller adapted to function as an Ethernet controller and an HDLC controller.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

DETAILED DESCRIPTION OF THE INVENTION
Notation Used Throughout
The following notation is used throughout this document.

| Term | Definition |
|---|---|
| ADSL | Asymmetric Digital Subscriber Line |
| AGC | Automatic Gain Control |
| ANSI | American National Standards Institute |
| CAD | Computer Aided Design |
| CAP | Carrierless Amplitude Modulation/Phase Modulation |
| CPE | Consumer Premises Equipment |
| CRC | Cyclic Redundancy Check |
| DBS | Direct Broadcast Satellite |
| DC | Direct Current |
| DSL | Digital Subscriber Line |
| DSLAM | DSL Access Multiplexer |
| EEPROM | Electrically Erasable Programmable Read Only Memory |
| EPROM | Erasable Programmable Read Only Memory |
| ETSI | European Telecommunications Standards Institute |
| FCS | Frame Check Sequence |
| FDM | Frequency Division Multiplexing |
| FEXT | Far End Crosstalk |
| FTTB | Fiber to the Building |
| FTTC | Fiber to the Curb |
| FTTCab | Fiber to the Cabinet |
| FTTEx | Fiber to the Exchange |
| FTTH | Fiber to the Home |
| FTTN | Fiber to the Node |
| HDLC | High level Data Link Control |
| HFC | Hybrid Fiber Coax |
| IFG | Interframe Gap |
| ISDN | Integrated Services Digital Network |
| LAPD | Link Access Procedure D |
| MAU | Media Attachment Unit |
| MMDS | Multichannel Multipoint Distribution Service |
| MPEG | Motion Picture Entertainment Group |
| NEXT | Near End Crosstalk |
| ONU | Optical Network Unit |
| OSI | Open Systems Interconnect |
| PC | Personal Computer |
| PLS | Physical Layer Signaling |
| POTS | Plain Old Telephone Service |
| PROM | Programmable Read Only Memory |
| QAM | Quadrature Amplitude Modulation |
| QoS | Quality of Service |
| RF | Radio Frequency |
| RFI | Radio Frequency Interference |
| SCC | Serial Communication Controller |
| SDLC | Synchronous Data Link Control |
| SDRAM | Synchronous Dynamic Random Access Memory |
| SNMP | Simple Network Management Protocol |
| SOC | Start of Cell |
| SOF | Start of Frame |
| USSB | US Satellite Broadcasting |
| UTP | Unshielded Twisted Pair |
| VDSL | Very High Speed Digital Subscriber Line |
| WWW | World Wide Web |

General Description

The present invention is an apparatus for and method of encapsulating Ethernet frame data in HDLC frames for transport over a Very high speed Digital Subscriber Line (VDSL) facility. The HDLC protocol formatted frames are transmitted over a point to point VDSL link where they are subsequently extracted and forwarded as standard Ethernet frames. The invention utilizes the widely known HDLC communications protocol to encapsulate Ethernet frames for transmission over the VDSL transport facility of the invention. An HDLC controller is employed to perform the conversion between Ethernet frames and HDLC frames.

As used throughout this document, the term HDLC frame is intended to denote a frame of data having a variable length that is transmitted over the VDSL transport facility. The HDLC frame appears on the line as a VDSL standard compatible analog signal representing the contents of the HDLC frame. The length of the HDLC frame varies in accordance with the length of the Ethernet frame encapsulated within. The HDLC frame of the present invention bears no relationship and should not be confused with the VDSL frame having a fixed length of 405 bytes as described in the VDSL Draft Specification published by the ANSI TIE1.4 Subcommittee.

Figure 1:
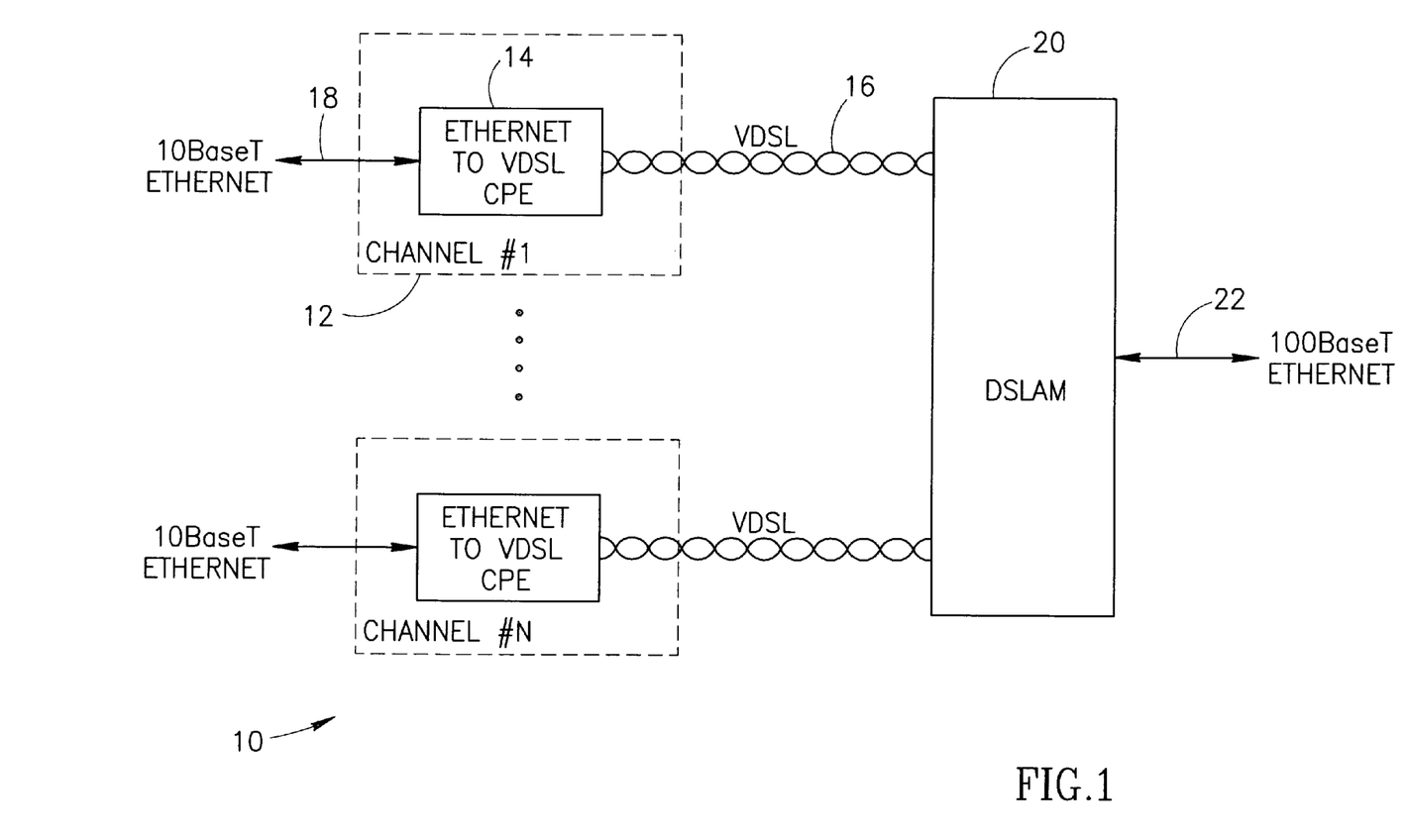
FIG. 1 is a block diagram illustrating a plurality of Ethernet to VDSL CPEs coupled to a DSLAM over a VDSL transport facility that utilizes the HDLC protocol.

A block diagram illustrating a plurality of Ethernet to VDSL CPEs coupled to a DSLAM over a VDSL transport facility that utilizes the HDLC protocol is shown in FIG. 1. The system, generally referenced 10, comprises one or more channels 12 labeled channel #1 through channel #N. Each channel comprises an Ethernet to VDSL Consumer Premises Equipment (CPE) 14 coupled to an Ethernet source 18 on one side and a VDSL transport facility 16 on the other. Each channel is coupled, via their respective VDSL facilities 16 to a DSL Access Multiplexor (DSLAM) 20. The DSLAM 20 is also coupled to a Fast Ethernet source 22, e.g., 100BaseTx or 100BaseFx Ethernet source.

Each Ethernet to VDSL CPE 14 functions to receive a 10BaseT Ethernet signal 18 and encapsulate the Ethernet frame into an HDLC frame for transmission over the VDSL facility 16. Likewise, the Ethernet to VDSL CPE 14 also functions to receive an HDLC formatted signal over the VDSL facility and extract Ethernet frames therefrom for output as standard 10BaseT Ethernet signals 18.

The DSLAM 20 is adapted to receive HDLC frames, extract Ethernet frames therefrom and generate and output a standard Ethernet signal. Likewise, the DSLAM 20 is also adapted to receive standard Ethernet frames from an Ethernet input signal 22 and encapsulate them in HDLC frames for transmission over the VDSL facility 16.

The VDSL facility 16 may comprise any suitable transport facility that is capable of transporting 10BaseT Ethernet data from one point to another. Preferably the VDSL facility conforms to the VDSL standard which is currently a draft specification being formulated by the ANSI TIE1.4 Technical Subcommittee.

A transport facility suitable for use with the present invention is the 10BaseS transport facility described in detail in U.S. Pat. No. 6,088,368, entitled 'Ethernet Transport Facility Over Digital Subscriber Lines,' incorporated herein by reference in its entirety. A brief description of the 10BaseS transmission system disclosed therein is provided below.

The 10BaseS transport facility is capable of transmitting 10 Mbps Ethernet over existing copper infrastructure. The system utilizes carrierless amplitude and phase modulation (CAP) which is a version of suppressed carrier quadrature amplitude modulation (QAM). QAM is the most commonly used form of high speed modulation over voice telephone lines. The system also utilizes frequency division multiplexing (FDM) to separate downstream channels from upstream channels. In addition, FDM is also used to separate both the downstream and the upstream channels from POTS and ISDN signals. A substantial distance in frequency is maintained between the lowest data channel and POTS frequencies to permit the use of very simple and cost effective POTS splitters, which are actually splitters/combiners. The upstream channel is placed above the downstream channel in frequency. The downstream and upstream data channels are separated in frequency from bands used for POTS and ISDN, enabling service providers to overlay 10BaseS on existing services.

The 10BaseS system combines copper access transmission technology of Ethernet based services with Quality of Service (QoS) guaranteed by the SRVP protocol and is capable of being fully managed through an SNMP agent. The 10BaseS transport facility can deliver symmetrical data at 11.78 Mbps (net 10.6 Mbps) over unshielded twisted pair (UTP) telephone wires originally intended for bandwidths of between 300 Hz and 3.4 KHz. QAM modulation and blind equalization are used to achieve a high transmission speed over existing copper infrastructure. In addition, the system is able to cope with several sources of noise such as impulse noise, e.g., POTS transients, radio frequency interference (RFI) noise and crosstalk noise, i.e., both near end crosstalk (NEXT) and far end crosstalk (FEXT). In terms of RF emissions, the system can operate using underground cabling as well as overhead distribution cabling.

Figure 2:
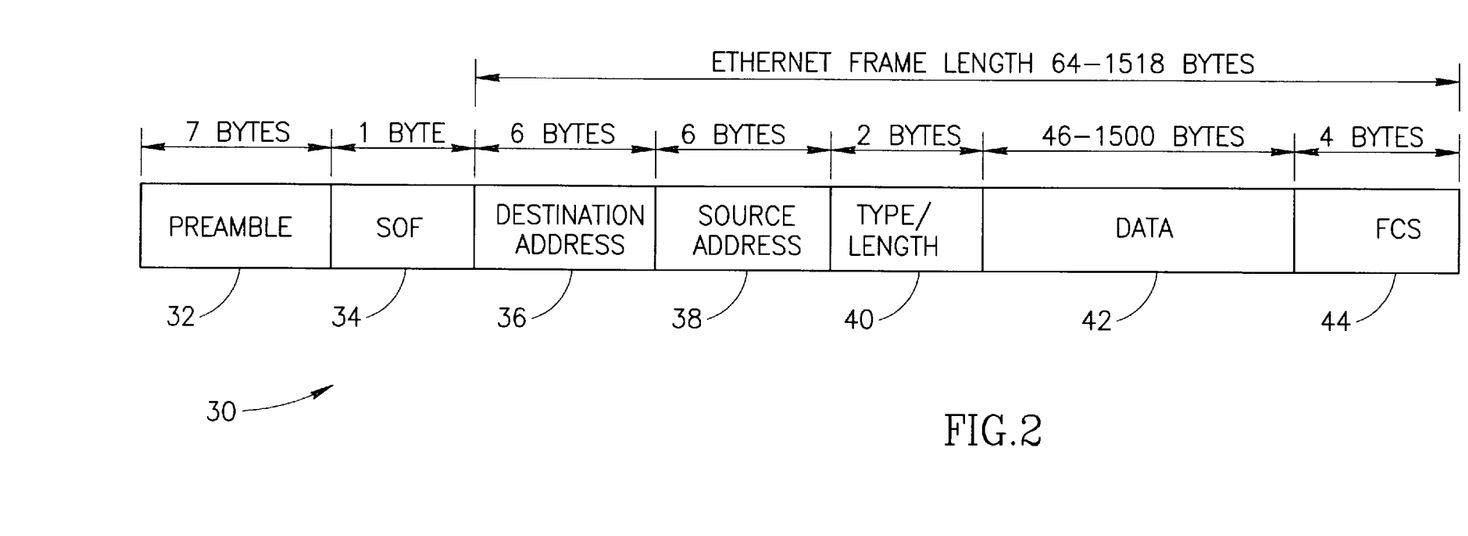
FIG. 2 is a diagram illustrating the format of a standard Ethernet frame.

A diagram illustrating the format of a standard Ethernet frame is shown in FIG. 2. A standard Ethernet frame, generally referenced 30, comprises a plurality of fields. The fields include a 7 byte preamble 32 consisting of 0×AA characters, a one byte Start of Frame (SOF) character 34 consisting of 0×AB, a 6 byte destination address 36, a 6 byte source address 38, 2 byte type/length 40, a data field 42 having a length from 46 to 1500 bytes, and a 4 byte Frame Check Sequence 44 that comprises a CRC check. The type/length field 40 may comprise either type or length data, depending on the variant of Ethernet used. The fields comprising the destination address 36, source address 38, type/length 40, data 42 and FCS 44 are commonly referred to as the Ethernet frame. Note that the Ethernet frame may comprise from 64 to 1518 bytes depending on the size of the data field. Data shorter than 46 bytes is padded to a minimum of 46 bytes.

In accordance with the 802.3 standard, Ethernet data is transmitted using Manchester coding whereby an idle character is transmitting using DC and a '0' and '1' characters are transmitted having a transition half way through the symbol, the transition for a '0' being opposite that for '1'.

Figure 3:
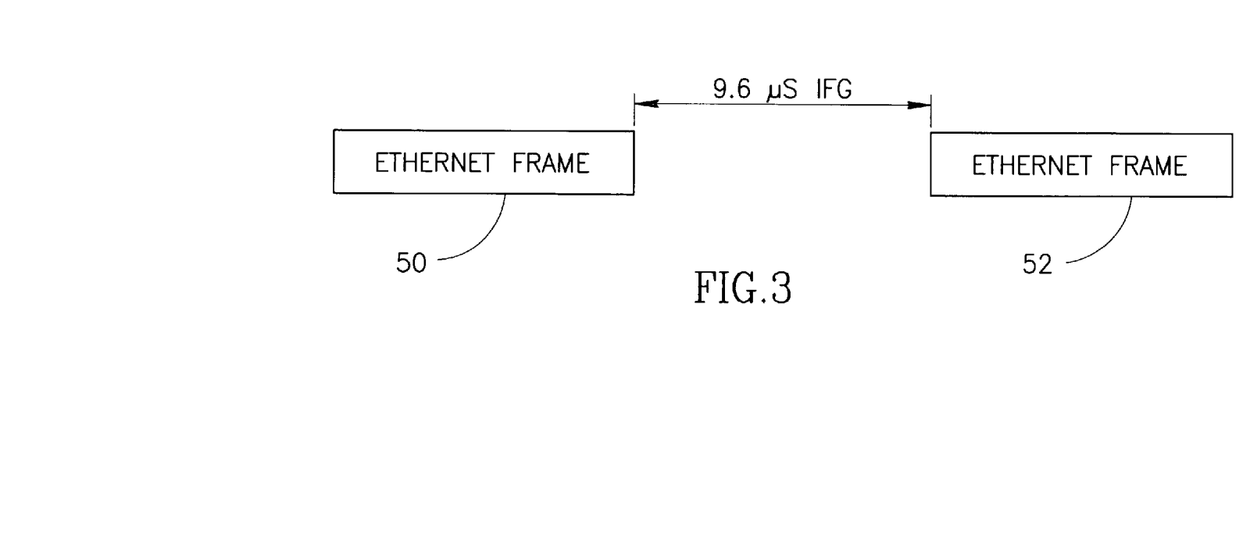
FIG. 3 is a diagram illustrating the interframe gap between two Ethernet frames.

A diagram illustrating the interframe gap between two Ethernet frames is shown in FIG. 3. The Ethernet IEEE 802.3 standard provides for a minimum Interframe Gap (IFG) of 9.6 microseconds between frames to facilitate collision detection and avoidance. The 9.6 microseconds IFG is equivalent to 12 bytes for 10 Mbps Ethernet. An example is shown whereby two Ethernet frames 50, 52 are separated by an IFG of 9.6 microseconds. The IFG is removed by the CPE 14 and is not transmitted over the VDSL facility. The IFG is inserted, however, when transmitting Ethernet frames constructed from HDLC frame data received over the VDSL facility.

Figure 4:
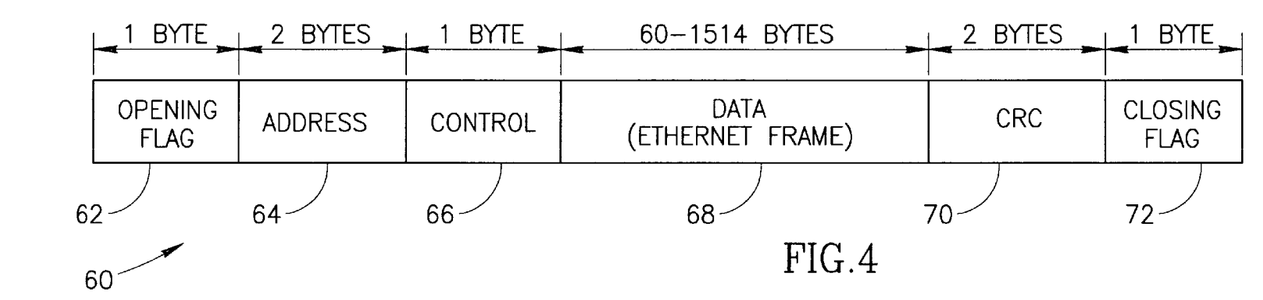
FIG. 4 is a diagram illustrating the format of HDLC frames that are transmitted over the VDSL facility.

A diagram illustrating the format of HDLC frames that are transmitted over the VDSL facility (or 10BaseS facility) is shown in FIG. 4. The HDLC frame, generally referenced 60, comprises a 1 byte opening flag field 62, a 2 byte address field 64, a one byte control field 66, a data field 68 that may range from 60 to 1514 bytes, a 2 or 4 byte CRC check field 70 and a closing flag field 72. Note that depending on the configuration of HDLC, the address field may be 8, 16 or 8N bits, the control field 8 or 216 bits and the CRC field 16 or 32 bits.

HDLC

In accordance with the present invention, Ethernet frames are encapsulated into HDLC frames and transported via the VDSL transmission facility. The High level Data Link Control (HDLC) protocol documented in ISO 3309 specifies a packetization standard for serial links. HDLC supports several modes of operation, including a simple sliding window mode for reliable delivery. Since many networks such as the Internet provide retransmission capability at the upper layers in the OSI communications stack, i.e., TCP, most Internet applications utilize the unreliable delivery mode Unnumbered Information feature of HDLC.

HDLC is one of the most common protocols in the data link layer (layer 2) of the OSI communication stack. Many variants of HDLC have been developed. For example, PPP and SLIP protocols both utilize a subset of the functionality of HDLC. The D channel in ISDN utilizes a slightly modified version of HDLC. The default serial link encapsulation of Cisco routers is HDLC. In addition, other common Layer 2 protocols, such as SDLC, SS7, AppleTalk, LAPB and LAPD are based on HDLC and its framing structure.

Characteristic to HDLC frames are flag characters 0×7E or 0b01111110 that are placed at the beginning and the end of the frame. In accordance with the protocol, flag characters may not appear in the intervening data, i.e., any data transmitted between the flag characters. To enforce this requirement, the data is modified in a transparent manner using a zero insertion/deletion process known as bit stuffing. Bit stuffing ensures that a data bit pattern matching the flag character (delimiter flag) does not occur in a field between flags. On bit synchronous links, a '0' is inserted after every sequence of five '1's. The longest sequence of '1's that may appear over the link (other than flag characters) is 0b0111110, which is one less '1' than the flag character.

The HDLC receiver is adapted to remove the '0's inserted into the data stream. After seeing five consecutive '1's, the receiver examines next bit. If the next bit is a '0', the bit is discarded and the frame processing continues. If the next bit is a '1', then the detection of a flag character sequence at the end of the frame is indicated.

The HDLC frame is synchronous and relies on the physical layer for clocking and synchronization of the transmitter and receiver. An address field carries the destination address of the frame because the Layer 2 frame can be sent over point to point link, broadcast networks, packet switched or circuit switched systems. The control field provides flow control number and defines the frame type, i.e., control or data. The length of the data field depends on the frame protocol. Typically, Layer 3 frames are carried in this data field. In accordance with the invention, variable length Layer 2 Ethernet frames are carried in the data field.

At the end of a frame, a Frame Check Sequence (FCS) is used to verify the integrity of the data. The FCS may be 16 or 32 bits long depending on the implementation. The FCS is a Cyclic Redundancy Check (CRC) checksum calculated using the following polynomial.

$$X^{16}+X^{12}+X^{5}+1 \tag{1}$$

Between the transmission of HDLC frames, the line idles. Most synchronous links constantly transmit data whereby all '1's are sent during the inter-frame periods, i.e., mark idle, or all flag characters are sent, i.e., flag idle.

The data field can have a length from 60 to 1514 bytes. This corresponds to the Ethernet frame being encapsulated. Note that before the Ethernet frame is encapsulated, its 4 byte FSC (CRC) field is stripped off, thus reducing the data field length by 4 bytes.

It is important to note that in accordance with the present invention, as described previously, the HDLC frame is transmitted without the use of the Tx or RxSOC signals provided by the VDSL transceiver. In place of the SOC signals, the standard HDLC protocol performs the role of providing a means for the receiver in the VDSL transceiver to know when an HDLC frame begins.

Ethernet to VDSL CPE

Figure 5:
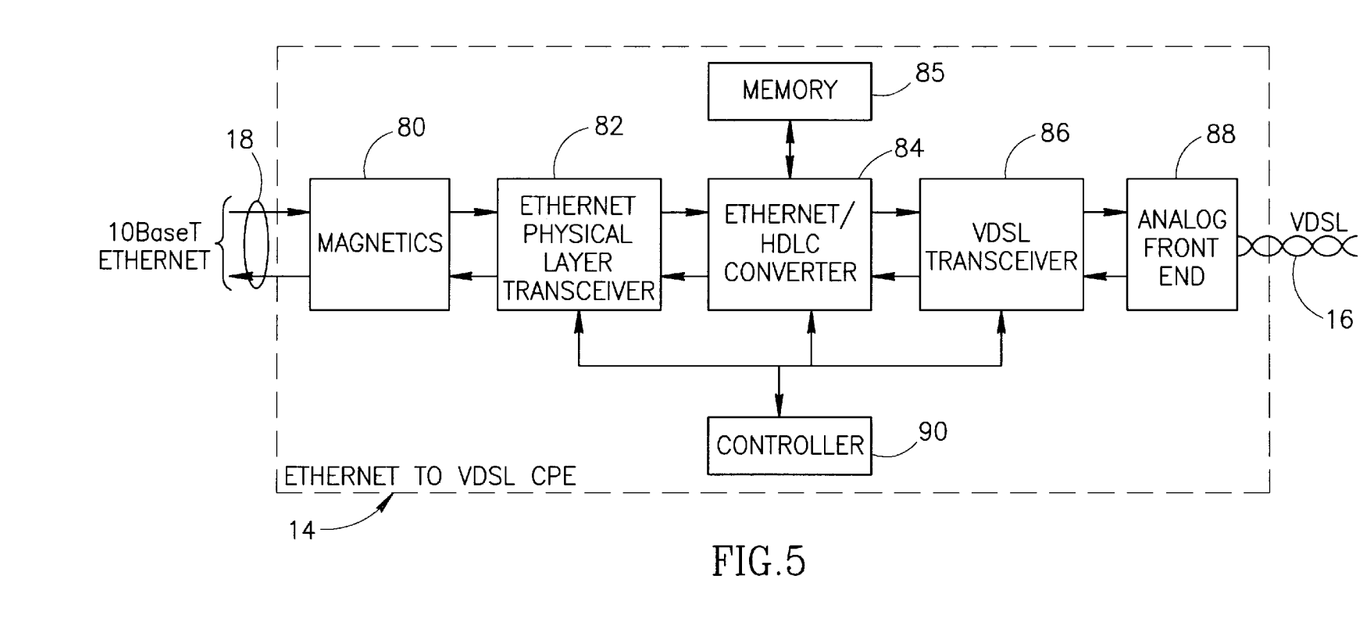
FIG. 5 is a block diagram illustrating the Ethernet to VDSL CPE in more detail.

The Ethernet to VDSL CPE unit will now be described in more detail. A block diagram illustrating the Ethernet to VDSL CPE in more detail is shown in FIG. 5. The Ethernet to VDSL CPE 14 functions to receive a 10BaseT Ethernet signal 18 and encapsulate the Ethernet frame into a HDLC frame for transmission over the VDSL facility. In the opposite direction, the Ethernet to VDSL CPE 14 functions to receive a VDSL signal in HDLC protocol format, extract Ethernet frames therefrom and output them as standard 10BaseT Ethernet signals.

The Ethernet to VDSL CPE unit 14 comprises Ethernet circuitry that includes magnetics 80 and Ethernet physical layer transceiver 82. The magnetics 80 interfaces to the 10BaseT Ethernet line 18 and generally comprises an isolation transformer and optionally one or more filters. The Ethernet physical layer transceiver 82 functions to perform the physical layer signaling (PLS) and Media Attachment Unit (MAU) functions as defined by the IEEE 802.3 specification for use with 10BaseT Ethernet networks. An Ethernet physical layer transceiver suitable for use with the present invention comprises the LXT905 10BaseT Ethernet transceiver manufactured by Level One Communications, Inc., Sacramento, Calif.

The Ethernet to VDSL CPE 14 also comprises an Ethernet/HDLC converter 84, memory 85, VDSL transceiver 86, analog front end 88 and controller 90. The output of the Ethernet physical layer transceiver 82 is input to the Ethernet/HDLC converter 84. The function of the converter is to encapsulate Ethernet frames received from the physical layer transceiver 82 into HDLC frames. In the other direction, the converter is adapted to extract Ethernet frames from the HDLC frames received from the VDSL facility. The physical layer transceiver 82 communicates with the Ethernet/HDLC converter 84 via a plurality of signal lines that comprise Tx and Rx data and control line, including clock and enable lines.

The converter 84 comprises an integral Ethernet controller to receive and transmit Ethernet frames to and from the Ethernet physical layer transceiver 82. Both the HDLC controller and the Ethernet controller can be implemented utilizing a commercially available microprocessor microcontroller.

The controller 90 functions to control the operation of the physical layer transceiver 82, Ethernet/HDLC converter 84 and VDSL transceiver 86. The converter stores frames during the conversion process in a buffer within memory 85.

The characteristics of the standard HDLC protocol, e.g., the sync flag, are used in the present invention to provide the receiving station an indication of the start of a HDLC frame. The bit stuffing capabilities built into the HDLC controller prevent the occurrence of a sync flag in the data stream.

The receiving station performs standard HDLC reception to determine whether the preamble detected is a sync flag indicating the start of a HDLC frame. The payload of the HDLC frame carries Ethernet frame data that can range from 60 to 1514 bytes.

The output of the converter 84 is input to the VDSL transceiver 86. The VDSL transceiver 86 functions to encode the received HDLC frame bit stream into a VDSL compatible analog signal. In the opposite direction, the VDSL transceiver functions to receive, the HDLC frame as an analog VDSL signal and output the HDLC in digital form.

A VDSL modem suitable for use in constructing the VDSL transceiver 86 of the present invention comprises the BCM6010 VDSL Transceiver manufactured by Broadcom Corporation, Irvine, Calif. or a VDSL modem manufactured by Savan Communications Ltd., Netanya, Israel.

The output of the VDSL transceiver 86 is input to an analog front end 88. The analog front end comprises a line driver amplifier in the transmit direction, Automatic Gain Control (AGC) circuit in the receive direction, isolation transformer and hybrid filters. The analog front end 88 generates the analog VDSL signal for transmission onto the VDSL copper line 16. The analog front end provides the interface in the receive direction that functions to receive the analog VDSL signal from the VDSL copper line and pass the signal through an AGC and filters before outputting it to the VDSL transceiver 86.

It is important to note that, in accordance with the invention, the SOC signals provided by the VDSL transceiver 86 are not utilized in transmitting the Ethernet frame data over the VDSL facility. Ethernet frames are encapsulated within HDLC frames and transmitted on the wire pair without regard to the state of the SOC signals. This overcomes the problems associated with synchronizing the transmission of the Ethernet data with the SOC signals.

In the Ethernet to VDSL direction, Ethernet frames are received over the 10BaseT Ethernet input signal port 18 and are input to the magnetics module 80. The analog output of the magnetics module is input to the Ethernet physical layer transceiver 82. The Ethernet signals are input, via Tx and Rx data and control lines, to the Ethernet/HDLC converter circuitry 84 which functions to encapsulate the Ethernet frame data received from the Ethernet port 18 into HDLC frames. The HDLC frames are then forwarded to the VDSL transceiver 86. The VDSL transceiver 86 functions to modulate the HDLC frame data and generate an analog VDSL signal that is input to the analog front end 88 which contains line drivers and filters. The signal output of the analog front end 88 is suitable for transmission over the twisted pair wire 16. Note that the HDLC frames may be transmitted using the 10BaseS transport facility described above.

In the VDSL to Ethernet direction, VDSL signals received over the twisted pair wire 16 (which may comprise 10BaseS signals) are received by the analog front end 88 which comprises an AGC circuit and one or more filters. The output of the analog front end 88 is input to the VDSL transceiver 86. The VDSL transceiver 86 functions to demodulate the analog signal received over the twisted pair wire 16 and output HDLC frames in digital form to the Ethernet/HDLC converter circuitry 84. The Ethernet/HDLC converter circuitry 84 functions to extract the Ethernet frame data encapsulated within the HDLC frame and generate standard Ethernet frames which are then forwarded to the Ethernet physical layer transceiver 82 for transmission over the 10BaseT port 18 via the magnetics module 80 which contains and isolation transformer and one or more filters.

The VDSL transceiver 86 functions to provide the clocking via TxCLK and RxCLK signals for both transmit and receive data signals TxData, RxData. In addition, the transceiver 86 provides a RxErr signal that is asserted when an error is detected in the received data. An error condition may comprise a framing error, loss of synchronization of the receive signal, etc. Further, the transceiver 86 provides a Tx and Rx Start of Cell (SOC) signal, TxSOC, RxSOC. The SOC signals, as defined in the VDSL draft standard, are suitable for use in transporting ATM cell data over VDSL and also suitable for general use in synchronizing the TxData signal input to the transceiver and the RxData output of the transceiver. The Tx and RxSOC signals provide a pulse at the beginning of the VDSL frame. A VDSL frame comprises a fixed number of bytes, e.g., 256, which has no relation to the number of bytes in an Ethernet frame.

As discussed previously in the Background Section of this document, the circuitry required to synchronize Ethernet frames to the VDSL frames in accordance with the SOC signals is very complex to design. The present invention overcomes this problem by sending and receiving Ethernet frame data over VDSL asynchronously with respect to the Tx or RxSOC signals. The invention functions to transmit the Ethernet frame data over the VDSL channel without utilizing the Tx or RxSOC signals. This eliminates any problems associated with synchronizing the Ethernet data to the SOC data. Problems include, for example, breaking up the Ethernet frame data into multiple sections to fit within the smaller VDSL frames (when the Ethernet frame exceeds 256 bytes) and subsequently regenerating the Ethernet frame by assembling the multiple smaller sections.

As discussed previously in the Background Section of this document, the circuitry required to synchronize Ethernet frames to the VDSL frames in accordance with the SOC signals is very complex to design. The present invention overcomes this problem by sending and receiving Ethernet frame data over VDSL asynchronously with respect to the Tx or RxSOC signals. The invention functions to transmit the Ethernet frame data over the VDSL channel without utilizing the Tx or RxSOC signals. This eliminates any problems associated with synchronizing the Ethernet data to the SOC data. Problems include, for example, breaking up the Ethernet frame data into multiple sections to fit within the smaller VDSL frames (when the Ethernet frame exceeds 256 bytes) and subsequently regenerating the Ethernet frame by assembling the multiple smaller sections.

Figure 6:
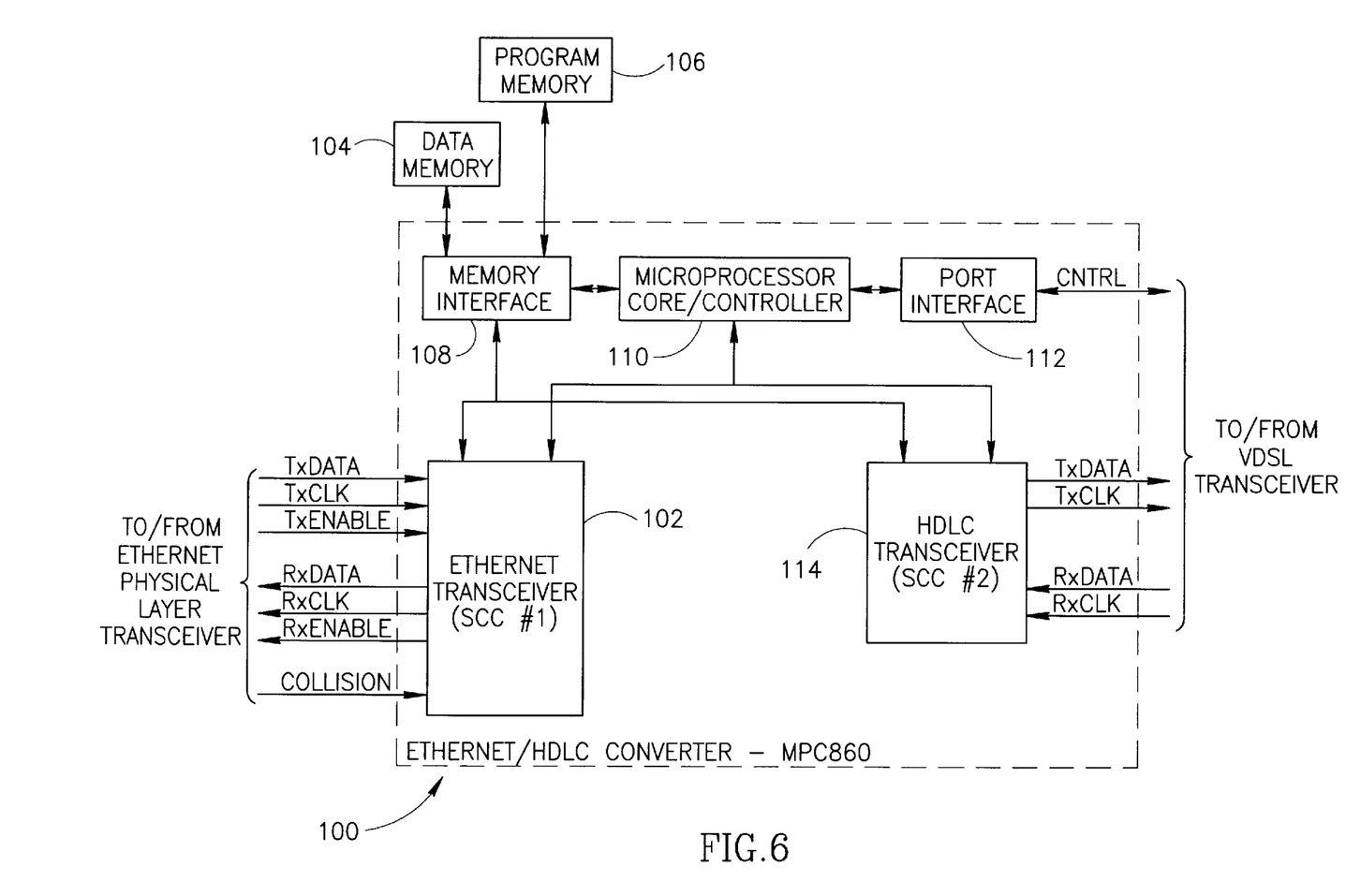
FIG. 6 is a block diagram illustrating the Ethernet/HDLC converter in more detail.

The Ethernet/HDLC converter will now be described in more detail. A block diagram illustrating the Ethernet/HDLC converter in more detail is shown in FIG. 6. The Ethernet/HDLC converter, generally referenced 100, can be implemented using any suitable microprocessor or microcontroller. In one embodiment, the converter is implemented using the Motorola MPC850 or MPC860 PowerQUICC series of microcontrollers manufactured by Motorola, Inc., Schaumburg, Ill. Note that one skilled in the art can apply the principles of the present invention to other microcontrollers or microprocessors as well. Note also that references to the MPC860 also refer to the MPC850.

The MPC860 comprises two onboard Serial Communications Controllers (SCCs) which are utilized by the present invention. One SCC is configured as an Ethernet controller (transmit and receive) and the other SCC is configured as an HDLC controller (for both transmit and receive). The functional blocks pertinent to the invention are shown in FIG. 6. Note that the complete functional description of the MPC860 is not shown or described here. A detailed description of the MPC860 can be found in the Motorola MPC860 PowerQUICC Users Manual, July, 1998, incorporated herein by reference.

The Ethernet transceiver (SCC #1) 102 is operative to receive the seven signal interface to the Ethernet physical player transceiver 82 (FIG. 5). The seven signals comprise TxData, TxCLK, TxEnable, RxData, RxCLK, Rx, Enable and a Collision indication signal. The HDLC transceiver (SCC #2) 114 is operative to interface to the VDSL transceiver 86 (FIG. 5) via four signals including TxData, TxCLK, RxData and RxCLK.

Both the Ethernet transceiver 102 and the HDLC transceiver 114 are adapted to read and write from data memory 104 via memory interface 108. The data memory may comprise any suitable memory, including but not limited to, Synchronous DRAM (SDRAM), static RAM, etc. The functionality of the MPC860 (not explicitly shown) is represented by the microprocessor core/controller block 110. Note that the core, suitably programmed, functions as the controller for the CPE 14.

A port interface circuit 112 provides a control interface to configure and control the VDSL transceiver and the physical layer transceiver. A program memory 106 functions to store the software, i.e., firmware, that the MPC860 executes. The program memory may comprise any suitable non volatile memory including but not limited to PROM, EPROM, EEPROM, FLASH, etc.

The software is suitably configured to perform, among other things, the configuration of both the Ethernet controller and the HDLC controller. Once the SCCs are configured as Ethernet and HDLC controllers, their operations are asynchronous with the core and can be either synchronous or asynchronous with respect to each other.

The Ethernet transceiver functions to receive Ethernet frames from the physical layer transceiver and verify the FCS. After the FCS is verified, it is stripped off and the frame is stored in data memory 104. The HDLC transceiver is operative to start sending flags once enabled and is notified on the availability of a frame stored in the data memory 104 awaiting transmission via the appropriate buffer descriptors. If one or more frames are found to be waiting transmission, the HDLC controller fetches the next frame from the data memory and begins sending the frame after the minimum number of flags specified between frames. When the end of the current buffer is reached, a new CRC is calculated and appended to the frame. Following the CRC, a closing flag is appended. The data is clocked out of the MPC860 to the VDSL transceiver using the TxData and TxCLK signal lines.

In the receive direction, the HDLC transceiver 114 receives the HDLC frames over the RxData and the RxCLK signal lines from the VDSL transceiver. The HDLC transceiver performs address recognition, CRC checking and maximum frame length checking. Once configured by the core, the HDLC receiver waits for the opening flag character. When it detects the first byte of the frame, it compares the frame address with the user defined values. If an address match is found, the remainder of the incoming frame is transferred to a buffer in the data memory 104.

When the frame ends, i.e., a closing flag character is received, the CRC field is checked against the recalculated value. The CRC is stripped off before it is stored in the data memory 104.

The Ethernet controller periodically polls the data memory for frames waiting transmission to the Ethernet port. If the buffer in the data memory is not empty, as indicated by a buffer descriptor, the next available frame is read from the data memory and a new FCS is calculated and appended to the frame. The complete Ethernet frame is output to the physical layer transceiver via the RxData, RxCLK and RxEnable signal lines.

Digital Subscriber Line Access Multiplexor

Figure 7:
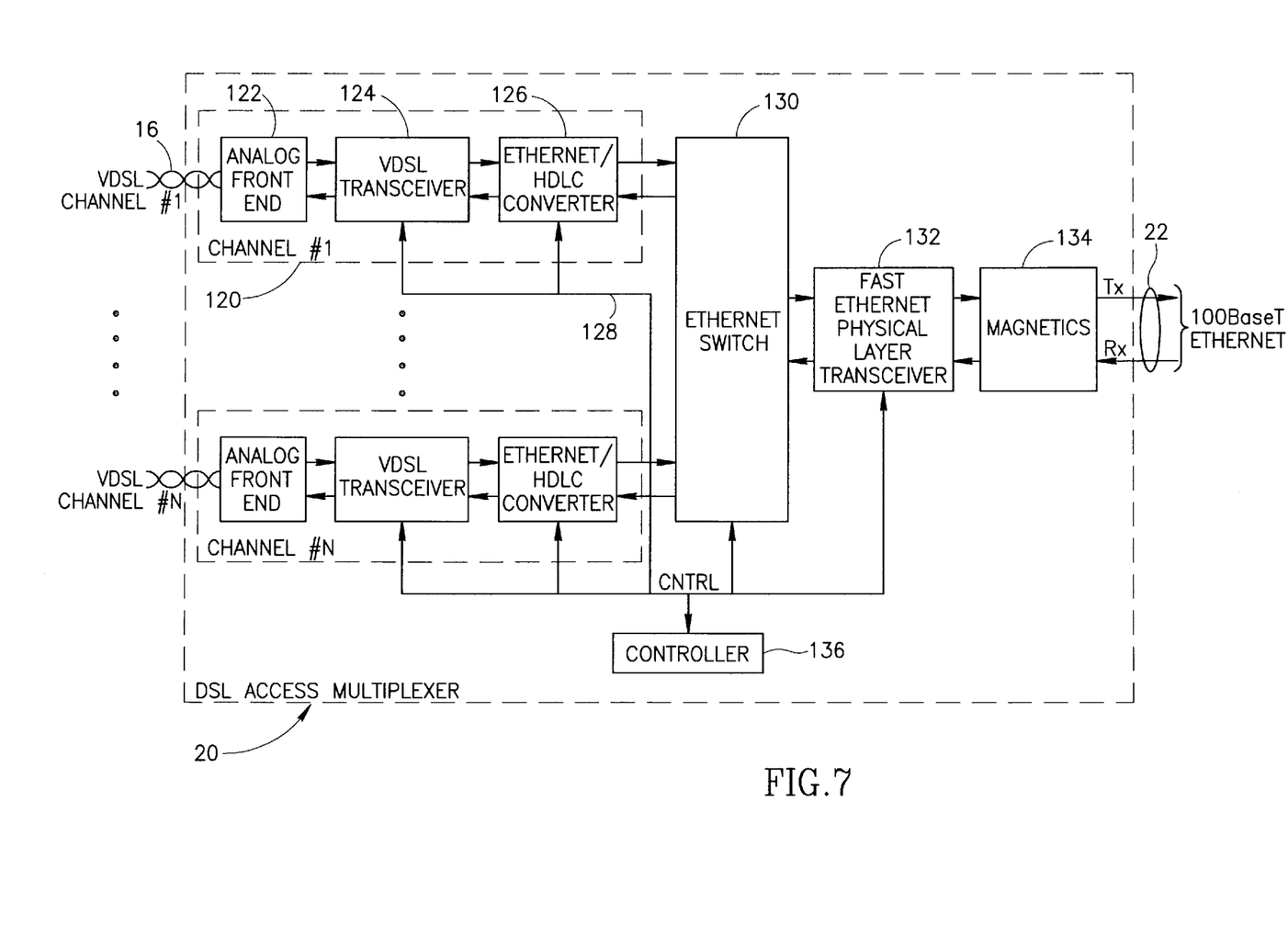
FIG. 7 is a block diagram illustrating the DSL Access Multiplexor (DSLAM) in more detail.

The Digital Subscriber Line Access Multiplexor (DSLAM) of the present invention will now be described in more detail. A block diagram illustrating the DSL Access Multiplexor (DSLAM) in more detail is shown in FIG. 7. A typical VDSL facility transport system comprises an Ethernet to VDSL Consumer Premises Equipment (CPE) coupled to a DSL Access Multiplexor (DSLAM) over a VDSL transport facility as illustrated in FIG. 1. The DSLAM is typically located at the curb or before the 'last mile' in a subscriber loop.

As described previously, the DSLAM 20 functions to encapsulate and extract Ethernet frames into and from HDLC frames from a plurality of channels. The DSLAM is adapted to receive HDLC frames from a number of channels, extract Ethernet frames therefrom and generate and output a standard Ethernet signal. In the opposite direction, the DSLAM is adapted to receive standard Ethernet frames from an Ethernet input signal and encapsulate them in HDLC frames for transmission over the VDSL facility to any of the attached channels.

The DSLAM typically is adapted to generate a plurality of VDSL streams to be transmitted over a plurality of VDSL facility channels 16 labeled channel #1 through channel #N. The VDSL signal received over each VDSL channel 16 is processed by channel circuitry 120. Each channel circuit 120 comprises an analog front end 122, VDSL transceiver 124 and Ethernet/HDLC converter 126.

The analog front end 122, VDSL transceiver 124 and Ethernet/HDLC converter 126 function similarly to the analog front end 88, VDSL transceiver 86 and Ethernet/HDLC converter 84 described in connection with FIG. 5, therefore a description of these elements will not be repeated here. Note, however, that an Ethernet/HDLC converter suitable for use with the present invention comprises the RJ-017 ChipBridge manufactured by Rad Data Communications Ltd., Israel. The RJ-017 ChipBridge is a full remote Ethernet bridge with an Ethernet interface on one side and an HDLC controller on the other. The chip performs full HDLC bit stream conversion, zero bit insertion/deletion, bit rate adaptation and provides an Ethernet front end.

On the Ethernet side, the DSLAM comprises a high speed Ethernet port 22 at the back end, magnetics module 134, an Ethernet physical layer transceiver 132 and an Ethernet switch 130. Each of the channels 120 interfaces to an Ethernet port on the Ethernet switch 130. The switch 130 may comprise any number of ports to accommodate the number of channels. Preferably, the switch comprises N 10BaseT ports and at least one Fast Ethernet port. The Fast Ethernet physical layer transceiver 132 functions to perform the physical layer signaling (PLS) and Media Attachment Unit functions as defined by the IEEE 802.3 specification for use with 10BaseT and 100BaseT Ethernet networks.

A controller 136 functions to control the operation of the VDSL transceivers 124, Ethernet/HDLC converters 126, Ethernet switch 130 and Fast Ethernet physical layer transceiver 132.

In the Ethernet to VDSL direction, Ethernet frames are received over the 100BaseT Fast Ethernet port 22 and are input to the magnetic module 134. The output of the magnetics is input to the Fast Ethernet physical layer transceiver 132. The magnetics 134 and physical layer transceiver 132 function similarly to the magnetics 80 and physical layer transceiver 82 described in connection with FIG. 5.

The Fast Ethernet signals are subsequently input to an Ethernet switch 130 capable of switching at Fast Ethernet speeds between N ports. The GT48212 Switched Ethernet Controller manufactured by Galileo Technology, Inc., San Jose, Calif. can be used to construct the Ethernet switch of the present invention. The Ethernet switch 130 is coupled to N channels 120 each comprising an Ethernet/HDLC converter 126 that performs Ethernet encapsulation and extraction to/from HDLC.

The converters 126 function to encapsulate the Ethernet frame data output from each of the ports of the switch 130 into HDLC frames and forward them to their respective VDSL transceivers 124. The VDSL transceivers 124 modulate the HDLC frame data and generate a signal that is the input to the analog front end 122. The output of the analog front end is a VDSL signal suitable for transmission over the twisted wire pairs 16. Note that the HDLC signal may be transmitted using the 10BaseS transport facility described above.

In the VDSL to Ethernet direction, for each channel, VDSL signals, e.g., 10BaseS signals, are received by the analog front end and output to the VDSL transceiver 124. A VDSL modem suitable for use in constructing the VDSL transceivers 124 of the present invention comprises the BCM6010 VDSL Transceiver manufactured by Broadcom, Irvine, Calif. or a VDSL transceiver manufactured by Savan Communications Ltd., Netanya, Israel.

Each VDSL transceiver 124 functions to demodulate the signal received over the twisted pair wires 16 and output HDLC frames to Ethernet/HDLC converter 126. The Ethernet/HDLC converter 126 functions to extract the Ethernet frame data encapsulated within the HDLC frame and generate standard Ethernet frames, which are then input to the corresponding port on the Ethernet switch 130. The switch forwards the Ethernet frames to the physical layer transceiver 132 for transmission over the 100BaseT port 22 via the magnetics module 134. Alternatively, the Ethernet frames may be transmitted to a 100BaseFx port via an optical transceiver.

Note that one skilled in the art could implement the CPE and DSLAM devices of the present invention using different components without departing from the scope of the present invention.

While the invention has been described with respect to a limited number of embodiments, it will be appreciated that many variations, modifications and other applications of the invention may be made.

What is claimed is:

1. A method of transporting Ethernet frames over a Very high speed Digital Subscriber Line (VDSL) transport facility coupling a first communication device and a second communication device, said method comprising the steps of:

receiving an input Ethernet frame on said first communication device from a fist Ethernet compatible communication device coupled thereto;

encapsulating entire said received Ethernet frame within a High level Data Link Control (HDLC) frame;

transmitting said HDLC frame over said VDSL transport facility, wherein said Ethernet frame is transmitted over said VDSL transport facility without regard to VDSL transmit and receive start of cell (SOC) signals;

receiving said HDLC frame on said second communication device;

extracting said Ethernet frame from said received HDLC frame and generating an output Ethernet fame therefrom; and     transmitting said output Ethernet frame to a second Ethernet compatible communication device coupled to said second communication device.

2. The method according to claim 1, wherein said step of encapsulating comprises the step of stripping off the preamble, start of frame fields and Cyclic Redundancy Check (CRC) fields from said Ethernet frame and calculating a new CRC before placing said Ethernet frame in said HDLC frame.

3. The method according to claim 1, wherein said step of generating comprises the step of adding Ethernet preamble and Ethernet start of frame fields and calculating a new CRC and appending it to said extracted Ethernet frame.

4. An Ethernet transport system for transporting Ethernet frames over one or more Very high speed Digital Subscriber Line (VDSL) transport facilities, said system comprising:

a plurality of channels wherein each channel comprises an Ethernet to VDSL Customer Premise Equipment (CPE) adapted to encapsulate entire Ethernet frames from a first Ethernet source into HDLC frames for transmission over said VDSL transport facility and to extract Ethernet frames from HDLC frames received over said VDSL transport facility;

an access multiplexor adapted to interface with said plurality of channels, said access multiplexor adapted to encapsulate entire Ethernet frames from a second Ethernet source into HDLC frames for transmission to one of said plurality of channels and to extract Ethernet frames from HDLC frames received over said plurality of channels; and wherein said Ethernet frames are transmitted over said VDSL transport facility without regard to VDSL transmit and receive start of cell (SOC) signals.

5. The system according to claim 4, wherein each channel comprises a microcontroller adapted to function as both an Ethernet controller and an HDLC controller.

6. The system according to claim 4, wherein each channel comprises means for encapsulating Ethernet frames adapted to strip off the preamble, start of frame fields and Cyclic Redundancy Check (CRC) fields from said Ethernet frame and calculate a new CRC before said Ethernet frame is placed in said HDLC frame.

7. The system according to claim 4, wherein each channel comprises means for generating output Ethernet frames from extracted Ethernet frames adapted to add Ethernet preamble and Ethernet start of frame fields and calculate a new CRC and append it to said extracted Ethernet frame.

8. The system according to claim 4, wherein said access multiplexor comprises means for encapsulating Ethernet frames adapted to strip off the preamble, start of frame fields and Cyclic Redundancy Check (CRC) fields from said Ethernet frame and calculate a new CRC before said Ethernet frame is placed in said HDLC frame.

9. The system according to claim 4, wherein access multiplexor comprises means for generating output Ethernet frames from extracted Ethernet frames adapted to add Ethernet preamble and Ethernet start of frame fields and calculate a new CRC and append it to said extracted Ethernet frame.

10. An Ethernet transport system for transporting Ethernet frames over one or more Very high speed Digital Subscriber Line (VDSL) transport facilities, said system comprising:

a plurality of channels wherein each channel comprises an Ethernet to VDSL Customer Premise Equipment (CPE), each CPE comprising:

means for receiving an Ethernet frame from a first Ethernet source and entirely encapsulating it within a High level Data Link Control (HDLC) frame;

means for transmitting said HDLC frame onto one of said VDSL transport facilities, wherein said Ethernet frames are transmitted over said VDSL transport facility without regard to VDSL transmit and receive start of cell (SOC) signals;

means for receiving said HDLC frame from one of said VDSL transport facilities;

means for extracting said Ethernet frame from said HDLC frame and forwarding it to said first Ethernet source;

an access multiplexor adapted to interface with said plurality of channels, said access multiplexor comprising:

an Ethernet switch having a plurality of ports;

means for receiving from each channel, HDLC frames from a corresponding VDSL transport facility;

means for extracting Ethernet frames from said HDLC frames and inputting them to a port on said Ethernet switch;

means for transmitting Ethernet frames from said port to a second Ethernet source;

means for receiving Ethernet frames from said second Ethernet source and inputting them to said Ethernet switch;

means for encapsulating entire said Ethernet frames output of said Ethernet switch into HDLC frames; and means for transmitting said HDLC frames onto one of said VDSL transport facilities, wherein said Ethernet frames are transmitted over said VDSL transport facility without regard to VDSL transmit and receive start of cell (SOC) signals.

11. The system according to claim 10, wherein said means for encapsulating and extracting on each of said channels comprises a microcontroller adapted to function as an Ethernet controller and an HDLC controller.

12. The system according to claim 10, wherein said means for encapsulating in each channel comprises means for stripping off the preamble, start of frame fields and Cyclic Redundancy Check (CRC) fields from said Ethernet frame and calculating a new CRC before said Ethernet frame is placed in said HDLC frame.

13. The system according to claim 10, wherein said means for extracting in each channel comprises means for generating output Ethernet frames from extracted Ethernet frames adapted to add Ethernet preamble and Ethernet start of frame fields and calculate a new CRC and append it to said extracted Ethernet frame.

14. The system according to claim 10, wherein said access multiplexor means for encapsulating comprises means for stripping off the preamble, start of frame fields and Cyclic Redundancy Check (CRC) fields from said Ethernet frame and calculating a new CRC before said Ethernet frame is placed in said HDLC frame.

15. The system according to claim 10, wherein said access multiplexor means for extracting comprises means for generating output Ethernet frames from extracted Ethernet frames adapted to add Ethernet preamble and Ethernet start of frame fields and calculate a new CRC and append it to said extracted Ethernet frame.

* * * * *